US006764621B2

United States Patent
Schwaighofer

(10) Patent No.: US 6,764,621 B2
(45) Date of Patent: Jul. 20, 2004

(54) METHOD FOR MOLDING A SOFT TRIM COMPONENT ONTO A SUBSTRATE

(75) Inventor: Armin Schwaighofer, Neuötting (DE)

(73) Assignee: Lear Corporation, Southfield, MI (US)

( * ) Notice: Subject to any disclaimer, the term of this patent is extended or adjusted under 35 U.S.C. 154(b) by 334 days.

(21) Appl. No.: 10/001,046

(22) Filed: Nov. 1, 2001

(65) Prior Publication Data

US 2002/0053750 A1 May 9, 2002

Related U.S. Application Data

(60) Provisional application No. 60/245,628, filed on Nov. 3, 2000.

(51) Int. Cl.[7] .......................... B29C 44/06; B29C 44/12
(52) U.S. Cl. .................. 264/46.5; 264/46.4; 264/46.6; 264/255; 264/309
(58) Field of Search ............... 264/46.6, 46.5, 264/46.4, 255, 309

(56) References Cited

U.S. PATENT DOCUMENTS

| 3,844,523 A | | 10/1974 | Wilheim | |
|---|---|---|---|---|
| 4,264,544 A | | 4/1981 | Wilheim | |
| 4,855,347 A | | 8/1989 | Falline et al. | |
| 4,878,827 A | | 11/1989 | Muller | |
| 4,899,526 A | * | 2/1990 | Harris | ........................ 56/320.2 |
| 5,017,634 A | | 5/1991 | Falline et al. | |
| 5,037,591 A | * | 8/1991 | Rohrlach et al. | .......... 264/46.5 |
| 5,082,609 A | * | 1/1992 | Rohrlach et al. | .......... 264/46.4 |
| 5,116,557 A | | 5/1992 | Debaes et al. | |
| 5,308,570 A | * | 5/1994 | Hara et al. | ................... 264/255 |
| 5,595,701 A | | 1/1997 | MacGregor et al. | |
| 5,658,509 A | * | 8/1997 | Sawyer et al. | ............. 264/46.4 |
| 5,662,996 A | | 9/1997 | Jourquin et al. | |
| 5,736,082 A | | 4/1998 | Funato et al. | |
| 5,824,251 A | * | 10/1998 | Morrison et al. | ........... 264/259 |
| 5,912,081 A | | 6/1999 | Negele et al. | |
| 5,965,083 A | | 10/1999 | Reichenberger | |
| 5,985,079 A | | 11/1999 | Ellison | |
| 6,076,246 A | | 6/2000 | McCooey | |

* cited by examiner

Primary Examiner—Allan R. Kuhns
(74) Attorney, Agent, or Firm—Bill C. Panagos

(57) ABSTRACT

A method and apparatus for making a composite article that includes a soft trim component employs a pair of mold halves, wherein a suitable skin material is sprayed onto a first mold cavity surface to obtain an in-mold coating, and a substrate is positioned between the mold halves such that a first area of one side of the substrate is located in opposition with the in-mold coating. A sprue defined in the second mold half, in opposition with the other side of the substrate, directs injected foam through an aperture in the substrate and into a gap defined between the one side of the substrate and the in-mold coating. A portion of the first mold half includes a layer of a sealing material that is harder than the substrate material to thereby eliminate the need to otherwise trim the overmolded soft trim component upon release from the mold.

16 Claims, 1 Drawing Sheet

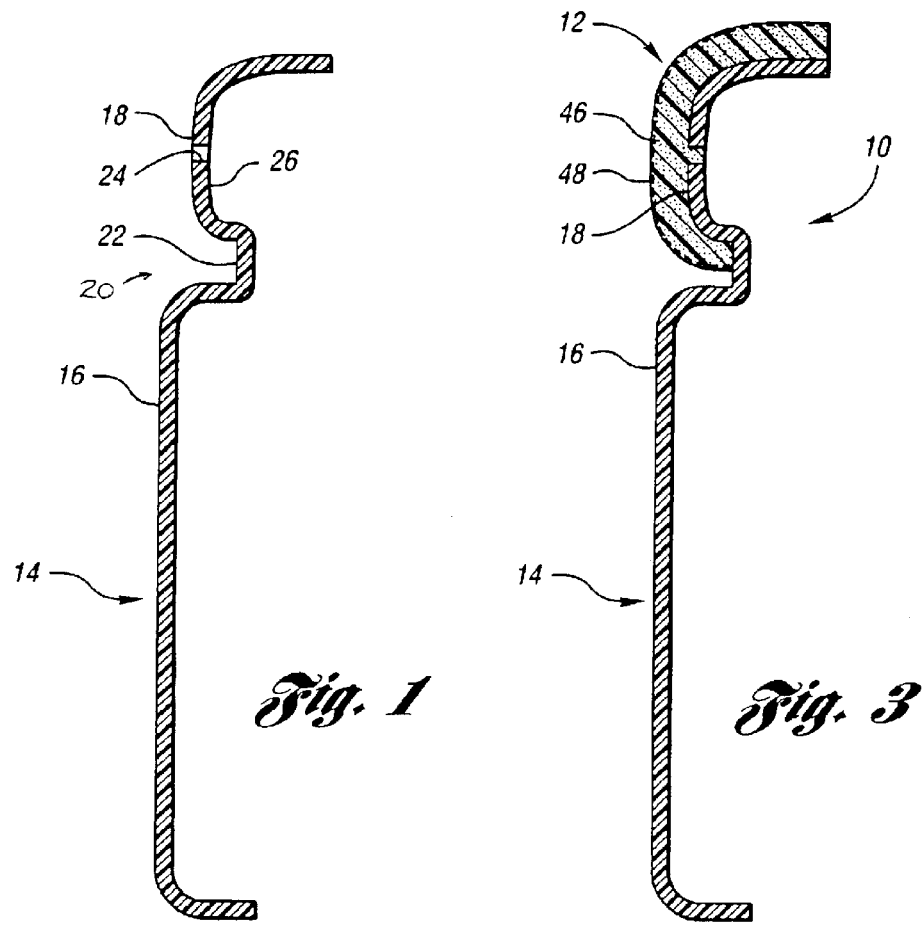
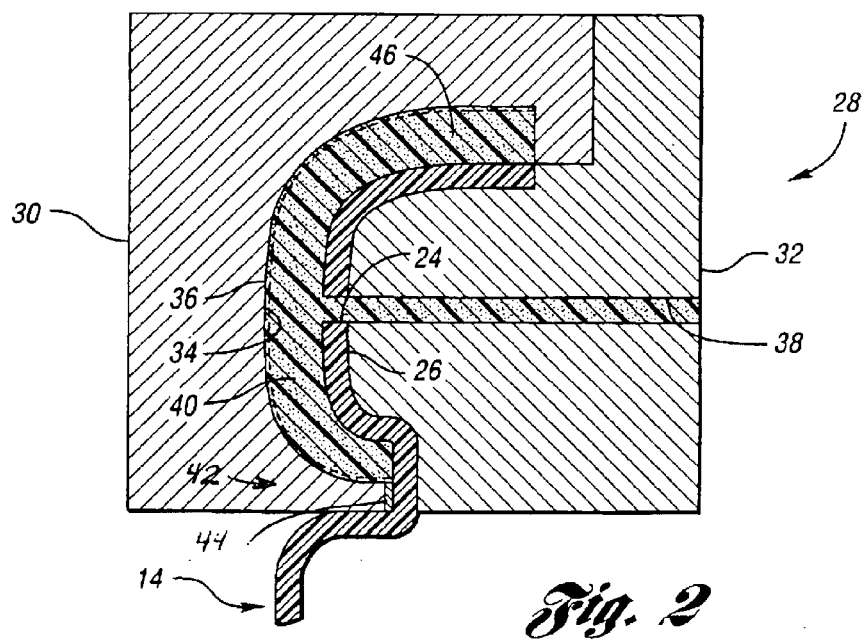

METHOD FOR MOLDING A SOFT TRIM COMPONENT ONTO A SUBSTRATE

CROSS REFERENCE TO RELATED APPLICATIONS

This application claims benefit of U.S. provisional application Serial No. 60/245,628 filed Nov. 3, 2000.

BACKGROUND OF THE INVENTION

1. Field of the Invention

The invention relates to a method and apparatus for making a composite article having a substrate component and a soft trim component.

2. Background Art

Vehicle interior door panels or other interior plastic components often have a hard, plastic substrate component and a soft trim component. The soft trim component can be manufactured from a PVC film, TPO and foam film, or a soft foam polyurethane that is applied to the substrate in a second process step. In the latter case, in order to provide the soft trim component with a desired surface texture and color, a separate skin material is carefully applied to the molded foam and then trimmed to provide the article with the desired "show surface." Alternatively, the separate skin material is carefully positioned in the mold tool before the foam is injected into the mold, with the excess skin material and any foam bleed thereafter being trimmed to obtain the finished article. This trimming of the skin results in a substantial waste of skin material, which adds further cost to the process.

In order to avoid the costly trimming operation after foam molding, U.S. Pat. No. 5,736,082 teaches a method for foaming a composite article wherein the substrate surface includes a recessed portion to which the foam is to be applied, such that the recessed portion includes peripheral side walls; and a skin member is carefully placed within the mold opposite the recessed portion of the substrate such that a series of raised "side walls" defined on the skin member are fitted in the substrate's recessed portion when the mold is closed. Upon injection of a polyurethane foam composition into the mold, the foam expands to force the side walls of the skin member against the peripheral side walls of the substrate's recessed portion, thereby effecting a peripheral seal to retain the foam material behind the skin material and, hence, avoiding a requirement for a subsequent trimming operation. Unfortunately, in order for the side walls of the skin material to perform the sealing operation, the skin member must be precisely placed within the mold cavity because a failure to obtain the desired seal will likely cause the foam material to bleed onto the show surface of the article, resulting in an unusable part and lower production yields. Moreover, the skin material must necessarily be more substantial in order for its side walls to remain raised during its placement in the mold and the subsequent mold closure, thereby further increasing material costs associated with the article.

Accordingly, what is needed is a method and apparatus for making a composite article including a substrate and an over molded soft trim component that reduces or eliminates a post-mold trimming operation in which manufacturing and materials costs are reduced, and production yields increased, without loss of quality, feel, or appearance.

SUMMARY OF THE INVENTION

Accordingly, it is an object of the invention to provide an improved method of making a composite article having a soft, overmolded trim component that reduces or eliminates the need to trim the overmolded component after the overmolding step.

It is a further object of the invention to provide a method of making a composite article wherein an overmolded foam component is mechanically locked and, preferably, also chemically bonded with a substrate.

Under the invention, a method of making a composite article having a soft trim component includes applying an in-mold coating onto at least a first mold cavity surface defined by a pair of mold halves, wherein the first mold cavity surface is contoured to define a shape and a surface texture of the soft trim component. The method further includes inserting, between the pair of mold halves, a substrate having a first surface including a first area, a second surface, and an aperture defining a closed path from the first area of the first surface to the second surface, wherein inserting includes positioning the first area of the first surface in opposition to the in-mold coating on the first mold cavity surface such that a gap is defined between the first surface of the substrate and the in-mold coating; and injecting a foam through the aperture into the gap. Because the foam is gated through the second surface, for example, a rear surface of the composite article opposite its "show surface," the invention beneficially eliminates the need for trimming the gate generated during foam injection.

In accordance with a feature of the invention, applying the in-mold coating includes spraying the in-mold coating onto the first mold cavity surface. And, under the invention, the in-mold coating may beneficially define a colored, show surface on the composite article while a grained first mold cavity surface imparts a desired grained surface texture to the article's resulting soft trim component.

In accordance with another feature of the invention, the foam and the material of the substrate are preferably selected such that the injected foam forms a chemical bond with the substrate while the portion of the foam gate extending through the substrate's aperture further serves to mechanically interlock the overmolded foam to the substrate. In a variation of the method, the step of injecting the foam includes bleeding the foam onto the second surface of the substrate to thereby further mechanically lock the foam to the substrate.

In accordance with yet another feature of the invention, the substrate preferably includes a second area immediately adjacent to the first area, and the first one of the mold halves includes a mold portion defining a peripheral edge of the first mold cavity surface; and further including seating the mold portion against the second area before injecting. Preferably, the material of the substrate has a first hardness, and wherein the mold portion includes a layer of a sealing material having a second hardness greater than the first hardness. Moreover, when the mold halves are brought together immediately prior to the foam injecting step, the mold portion of the first mold half preferably coins the second area of the substrate to thereby further improve the seal between the mold portion and the substrate. As a result, the bleeding of injected foam during the injecting step out of the first mold cavity is effectively eliminated, thereby also reducing or eliminating the need for trimming the soft trim component along the interface between the first and second areas of the substrate's first surface.

Other features, advantages and benefits of the invention will be apparent from the following description, including the accompanying Drawings.

BRIEF DESCRIPTION OF THE DRAWINGS

FIG. 1 is a sectional view of a substrate adapted for use in making a composite molded article in accordance with the invention;

FIG. 2 is a sectional view of an exemplary tool in accordance with the invention for making the composite molded article using the substrate illustrated in FIG. 1; and FIG. 3 is a sectional view of the resulting composite article produced with the method and apparatus of the invention.

DETAILED DESCRIPTION OF THE PREFERRED EMBODIMENT

Referring to the Drawings, FIGS. 1–3 illustrate various stages of manufacture of an exemplary composite article 10 having a soft trim component 12 in accordance with the invention, as might be advantageously used as an interior trim door panel of a motor vehicle. As illustrated in FIG. 1, the substrate 14 has a first surface 16 that includes a first area 18, against which a soft trim component will be applied as described below, an a second area 20 that preferably features a surface recess or groove 22 immediately adjacent to the first area 18. The substrate 12 also includes an aperture 24 that defines a closed path between the first area 18 on the substrate's first surface 16 and a second surface 26 of the substrate 12, for example, opposite the first surface 16.

While the invention contemplates use of any suitable material for the substrate 14, in an exemplary embodiment, the substrate 14 is conveniently injection molded from a suitable plastic material, such as polypropylene, ABS, ABSPC, and other suitable materials including olefin-based materials. However, it will be appreciated that the invention contemplates the use of any other suitable materials for the substrate 14, such as steel or aluminum, and produced by other manufacturing processes, such as compression molding or stamping. Further, the invention contemplates that the substrate 14 is either unpainted, or partially laminated or covered with another material prior to the foam overmolding step as described below, including a suitable paint.

As best seen in FIG. 2, the substrate 14 is inserted into an injection molding tool 28 that includes first and second mold halves 30,32, after a first mold cavity surface 34 defined by the first mold half 30 has been sprayed with a suitable in-mold coating 36 that will ultimately form the "show surface" or "skin" of the article's soft trim component 12. While the invention contemplates use of any suitable material for the in-mold coating, including a variety of aliphatic polyurethane, in the exemplary article 10, the in-mold coating is a lacquer available from BASF Corporation of Wyandotte, Mich., under the trade name "Elastogran." In the exemplary article 10, the in-mold coating 36 acts as a paint for coloring the article's show surface while further providing UV protection to the soft trim component 12.

Also as seen in FIG. 2, the first mold cavity surface 34 is contoured to define the desired shape of the soft trim component 12 and is preferably grained, for example, to impart a desired surface texture to the article's soft trim component 12. The second mold 32 half includes a sprue 38 by which a suitable foam is directed between the two mold halves 30,32 during a subsequent injection molding step.

The molding tool 28 is then closed about the substrate's first area 18, as illustrated in FIG. 2, to thereby define a gap 40 between the substrate 10 and the in-mold coating 36. In accordance with another feature of the invention, a portion 42 of the first mold half 30 adjacent to the first mold cavity surface 34 engages the second area 20 of the substrate 14, for example, within groove 22, so as to generate a seal there between. Preferably, the mold portion 42 includes a thin layer of a sealing material 44, such as polytetrafluoroethylene (PTFE) or silicon, that has a hardness greater than the material of the substrate 14 but less hard than the material of the first mold half 30. In this way, upon closure of the mold 28, the sealing material 44 deforms to generate the desired seal. Still further, the mold halves 30,32 are preferably brought together in such a manner as to press the mold portion 42 slightly into the first surface 16 of the substrate 14 to thereby slightly "coin" the surface 16 with the mold portion 42. In this manner, the resulting seal between the first mold half 30 and the first surface 16 of the substrate 14 is yet further improved.

With the molding tool 28 closed about the substrate's first area 18, as illustrated in FIG. 2, a foam 46 is directed into the sprue 38 of the second mold half 32 and through the substrate's aperture 24 into the gap 40, and foams to fill the gap 40. While the invention contemplates the use of any suitable injected foam 46, by way of example only, the foam 46 in the exemplary article 10 is an aromatic polyurethane. Other suitable foam 46 for use with the invention includes TPO and thermoplastic elastomers. Preferably, the injected foam 46 is preferably selected such that, upon injecting the foam 46 between the in-mold coating and the substrate 14, the foam 46 chemically bonds with both the in-mold coating and the substrate 14.

In accordance with a feature of the invention, by injecting the foam 46 through the aperture 24 of the substrate 14, and from the second surface or "back side" of the substrate 14, the highest quality show surface 36 is provided on the soft trim component 12 because no injection molding sprue is needed on the show surface.

In accordance with another feature of the invention, the aperture 24 in the substrate 14 may include a draft angle (not shown) which is operative to mechanically lock the injected foam 46 into the aperture 24 when the molded part is removed from the mold 28. Further, where design parameters permit, the foam 48 may also preferably bleed onto the second surface 26 of the substrate 14 to thereby further mechanically lock the foam 46 to the substrate 14. One of ordinary skill in the art will recognize that various locking configurations may be provided on the substrate within the scope of the invention. Such mechanical locking of the soft trim component 12 to the substrate 14 is particularly desirable, for example, when the substrate material such as olefin-based materials does not chemically bond to the foam.

As the substrate 14 and foam 46 are removed from the mold 28, the in-mold coating 36 sticks to the foam 46 and is thereby peeled off the mold cavity surface 34. The result, as illustrated in FIG. 3, is a soft trim component 12 of a composite article 10 having a grained, soft show surface 48, requiring little or no trimming of the overmolded foam 46 upon release from the mold 28.

While an exemplary embodiment according to the invention has been illustrated and described, it is not intended that this embodiment illustrate and describe all possible forms of the invention. Rather, the words used in the specification are words of description rather than limitation, and various changes may be made within the scope of the appended claims.

What is claimed:

1. A method of making a composite article having a soft trim component comprising:

spraying an in-mold coating onto a first mold cavity surface defined by a pair of mold halves, the first mold cavity surface being contoured to define a shape and a surface texture of the soft trim component;

inserting, between the pair of mold halves, a substrate having a first surface including a first area, a second surface, and an aperture defining a closed path from the first area of the first surface to the second surface, wherein inserting includes positioning the first area of the first surface in opposition to the in-mold coating on the first mold cavity surface such that a gap is defined between the first surface of the substrate and the in-mold coating; and injecting a foam through the aperture into the gap.

2. The method of claim 1, wherein the in-mold coating forms a colored, show surface on the composite article.

3. The method of claim 2, wherein the first mold cavity surface is grained, and spraying imparts surface texture to a surface of the in-mold coating.

4. The method of claim 1, further including molding the substrate of a plastic material before inserting.

5. The method of claim 1, further including selecting the foam and substrate such that the injected foam forms a chemical bond with the substrate.

6. The method of claim 1, wherein injecting includes bleeding injected foam onto the second surface of the substrate to thereby mechanically lock the foam to the substrate.

7. The method of claim 1, wherein the substrate includes a second area of the first surface immediately adjacent to the first area, and the first one of the mold halves includes a mold portion defining a peripheral edge of the first mold cavity surface; and further including seating the mold portion against the second area before injecting.

8. The method of claim 7, wherein the material of the substrate has a first hardness, and wherein the mold portion includes a layer of a sealing material having a second hardness greater than the first hardness.

9. The method of claim 7, wherein seating includes coining the second area of the substrate with the mold portion, whereby a seal is substantially provided between the second area of the substrate and the mold portion.

10. A method of making a composite trim panel having a soft trim component comprising:

providing a plastic substrate having a first surface with a first area and a second area, a second surface, and an aperture defining a closed path from the first surface to the second surface;

spraying an in-mold coating onto a mold cavity surface defined by one of a first and second mold halves, the mold cavity surface being contoured to define a shape and a surface texture of the soft trim component;

inserting the plastic substrate into the mold cavity such that a gap exists between the substrate and the in-mold coating and such that only the first area of the first surface of the substrate faces the tin-mold coating; and injecting foam through the aperture into the gap between the first surface of the substrate and the in-mold coating such that the in-mold coating defines a colored, show surface on the composite trim panel.

11. The method of claim 10, wherein the first mold cavity surface is grained, and spraying imparts a surface texture to a surface of the in-mold coating.

12. The method of claim 10, further including selecting the foam and substrate such that the injected foam forms a chemical bond with the substrate.

13. The method of claim 10, wherein injecting includes bleeding injected foam onto the second surface of the substrate to thereby mechanically lock the foam to the substrate.

14. The method of claim 10, wherein the one of the mold halves includes a mold portion defining a peripheral edge of the first mold cavity surface; and further including seating the mold portion against the second area before injecting.

15. The method of claim 14, wherein the material of the substrate has a first hardness, and wherein the mold portion includes a layer of a sealing material having a second hardness greater than the first hardness.

16. The method of claim 14, wherein seating includes coining the second area of the substrate with the mold portion to thereby provide a seal between the second area of the substrate and the mold portion.

\* \* \* \* \*